(12) United States Patent
Yamada et al.

(10) Patent No.: US 6,731,461 B2
(45) Date of Patent: May 4, 2004

(54) MAGNETIC HEAD

(75) Inventors: Yuichi Yamada, Kawasaki (JP);
Toshinori Hoshino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 199 days.

(21) Appl. No.: 09/982,078

(22) Filed: Oct. 17, 2001

(65) Prior Publication Data

US 2003/0021065 A1 Jan. 30, 2003

(30) Foreign Application Priority Data

Jul. 26, 2001 (JP) ........................................ 2001-226433

(51) Int. Cl.⁷ ............................................... G11B 5/147
(52) U.S. Cl. ........................ 360/126; 360/313; 360/317
(58) Field of Search ................................. 360/126, 313, 360/317, 234.5, 234.7

(56) References Cited

U.S. PATENT DOCUMENTS

| | | | |
|---|---|---|---|
| 5,668,688 A | * | 9/1997 | Dykes et al. ............... 360/126 |
| 6,163,436 A | * | 12/2000 | Sasaki et al. ............... 360/126 |
| 6,381,094 B1 | * | 4/2002 | Gill ............................ 360/126 |

FOREIGN PATENT DOCUMENTS

| | | | |
|---|---|---|---|
| JP | 62-128011 | 6/1987 | |
| JP | 06-223331 | 8/1994 | |
| JP | 06-274830 | 9/1994 | |
| JP | 07-210829 | 8/1995 | |
| JP | 09-167314 | 6/1997 | |
| JP | 2000057534 A | * 2/2000 | ............ G11B/5/39 |

* cited by examiner

*Primary Examiner*—David L. Ometz
*Assistant Examiner*—Mark Blouin
(74) *Attorney, Agent, or Firm*—Greer, Burns & Crain, Ltd.

(57) ABSTRACT

The magnetic head of the present invention is capable of improving heat radiativity and preventing overheat of the magnetic head. The magnetic head comprises: a slider having a disk-side face; an element for reproducing data; a shielding layer; a coil for writing data; magnetic poles; a heat radiating layer for radiating heat generated in the magnetic head; and an insulating layer for electrically insulating the heat radiating layer. The heat radiating layer is provided near the element or the coil without touching the element, the shielding layer, the coil and the magnetic poles. The heat radiating layer is made of a material whose heat conductivity is higher than that of the insulating layer. An end of the heat radiating layer is exposed in the disk-side face of the slider.

7 Claims, 11 Drawing Sheets

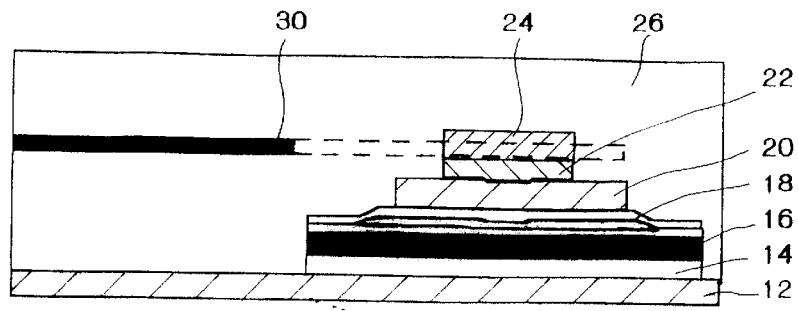
FIG.5
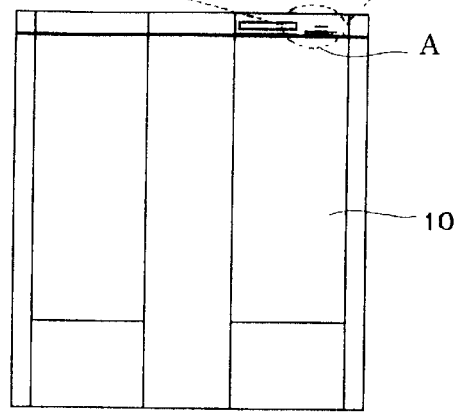
FIG.6
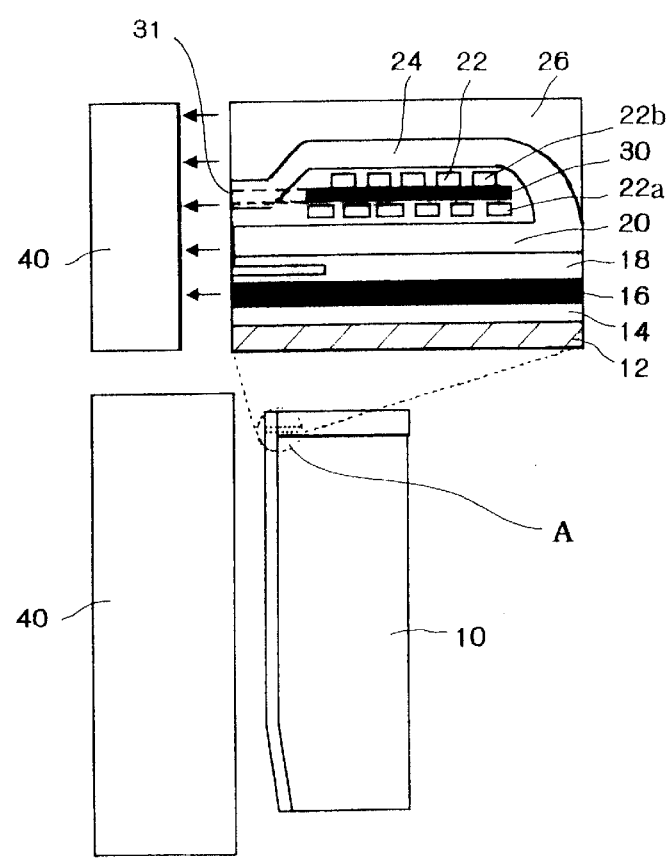

FIG. 19A
PRIOR ART
FIG. 19B
PRIOR ART
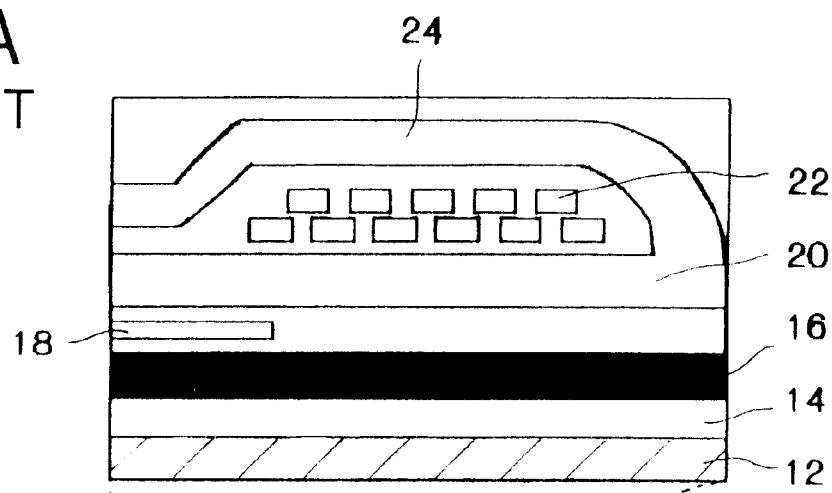
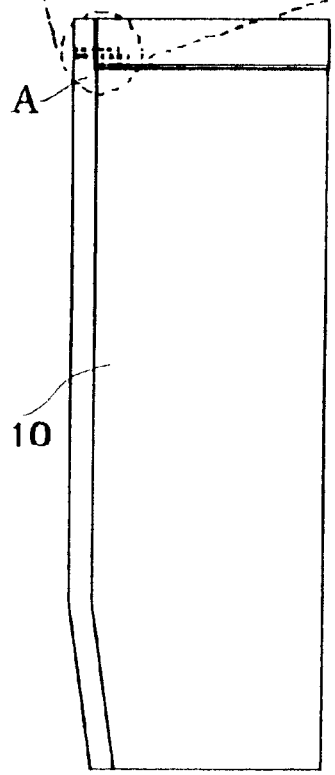

MAGNETIC HEAD

BACKGROUND OF THE INVENTION

The present invention relates to a magnetic head, more precisely relates to a magnetic head capable of efficiently radiating heat generated in an element for reproducing data and preventing overheat of the element.

These days, magnetic disk units having large memory capacity and high memory density are required. Further, precise and compact magnetic disk units are required. The element for reproducing date of a conventional magnetic head is shown in FIGS. 18A, 18B, 19A and 19B. FIG. 18A is a sectional view of a recording and reproducing section "A" of a slider 10 seen from a disk-side face thereof; FIG. 18B is a plan view of the slider 10 seen from the disk-side face; FIG. 19A is a sectional view of the writing and reproducing section "A" seen from a side face of the slider 10; FIG. 19B is a side view of the slider 10.

In FIGS. 18A and 19A, a symbol 12 stands for an ALTIC ($Al_2O_3TiC$) substrate which is a basic material of the slider 10; a symbol 14 stands for an alumina insulating layer; a symbol 16 stands for a lower shielding layer; a symbol 18 stands for an MR element layer, a symbol 20 stands for a lower magnetic pole; a symbol 22 stands for a coil for writing data; and a symbol 24 stands for an upper magnetic pole. Note that, the lower magnetic pole 20 acts as an upper shielding layer of an element for recording data.

In the conventional compact magnetic head, heat is generated in elements for reproducing and writing data and a problem of overheating the magnetic head is occurred. FIG. 20 is a plan view of the coil 22 for writing data. In the coil 22, a part "B" enclosed by an upper magnetic pole 24 is made compact so as to write data with high frequency. With this structure, in the part "B", thickness of the coil 22 is made thinner and width of the coil 22 is made narrower. Therefore, in the conventional compact magnetic head, sectional area of the coil wire must be smaller, spaces between the coil wire must be narrower, so that the coil 22 is apt to be overheated. By overheating the coil 22, the wire of the coil 22 is apt to be broken and a span of life of the coil 22 is made shorter.

To prevent the overheat of the magnetic head, several methods have been invented. For example, sectional area of the coil wire other than a part enclosed by a magnetic pole is made broader and spaces between the coil wire other than said part is made wider; area of a lower magnetic pole is made broader to improve heat-radiativity (see Japanese Patent Gazette No. 62-128011); a non-magnetizable metal is made contact with an upper shielding layer so as to act as a heat sink (see Japanese Patent Gazette No. 9-167314); a heat radiating layer made of a non-magnetizable material is provided in an MR layer (see Japanese Patent Gazette No. 7-210829); an insulating layer of a lead element layer is made of a material having high heat conductivity, e.g., silicon, diamond-like-carbon (see Japanese Patent Gazette No. 6-223331); and an insulating layer of a lead element layer is made of a aluminum nitride having high heat conductivity (see Japanese Patent Gazette No. 6-274830).

However, the conventional methods have following disadvantages.

For example, in the case of making the sectional area of the coil wire broader and making the spaces between the coil wire wider, heat generated in the part of the coil enclosed by the magnetic pole cannot be effectively restricted. In the case of using the material having high heat conductivity for the insulating layer of the lead element layer, heat is conducted toward an upper face or a bottom face of the layers so the heat cannot be effectively radiated. Further, in the case of making the non-magnetizable metal contact with the upper shielding layer as the heat sink, another manufacturing step other than forming the coil for writing data is required.

SUMMARY OF THE INVENTION

The present invention has been invented to solve the disadvantages of the conventional magnetic heads.

An object of the present invention is to provide a magnetic head for a large-capacity magnetic disk unit, which is capable of improving heat radiativity and preventing overheat of the magnetic head.

To achieve the object, the present invention has following structures.

The magnetic head of the present invention comprises: a slider having a disk-side face; an element for reproducing data; a shielding layer; a coil for writing data; magnetic poles; a heat radiating layer for radiating heat generated in the magnetic head; and an insulating layer for electrically insulating the heat radiating layer, wherein the heat radiating layer is provided near the element or the coil without touching the element, the shielding layer, the coil and the magnetic poles, the heat radiating layer is made of a material whose heat conductivity is higher than that of the insulating layer, and an end of the heat radiating layer is exposed in the disk-side face of the slider.

Preferably, the heat radiating layer and the coil are formed in the same layer.

Further, the preferable heat radiating layer is made of a non-magnetizable material including at least Pt, Au, Ag, Cu, Co, Ni, Fe or Al. With this structure, heat radiativity and electric-magnetic converting property of the magnetic head can be improved.

In the present invention, the heat generated in the magnetic head can be effectively radiated from the heat radiating layer, so that rising temperature of the magnetic head can be restricted and overheat of the magnetic head can be prevented. Therefore, a reliable magnetic head for a large-capacity magnetic disk unit can be provided. Since the heat radiating layer is provided without touching the element, the shielding layer, the coil and the magnetic poles, the electric-magnetic converting property of the magnetic head is not badly influenced. Further, the heat radiating layer can be formed in a step of forming the element, so the magnetic head of the present invention can be manufactured by a system for manufacturing the conventional magnetic heads.

BRIEF DESCRIPTION OF THE DRAWINGS

Embodiments of the present invention will now be described by way of examples and with reference to the accompanying drawings, in which:

FIG. 5 is a sectional view of a magnetic head of a third embodiment;

FIG. 6 is a side sectional view of the magnetic head of the third embodiment;

FIG. 19A is the sectional view of the recording and reproducing section of the conventional magnetic head;

FIG. 19B is the side view of the conventional slider; and

DETAILED DESCRIPTION OF THE PREFERRED EMBODIMENTS

Preferred embodiments of the present invention will now be described in detail with reference to the accompanying drawings.

First Embodiment

Figure 1:
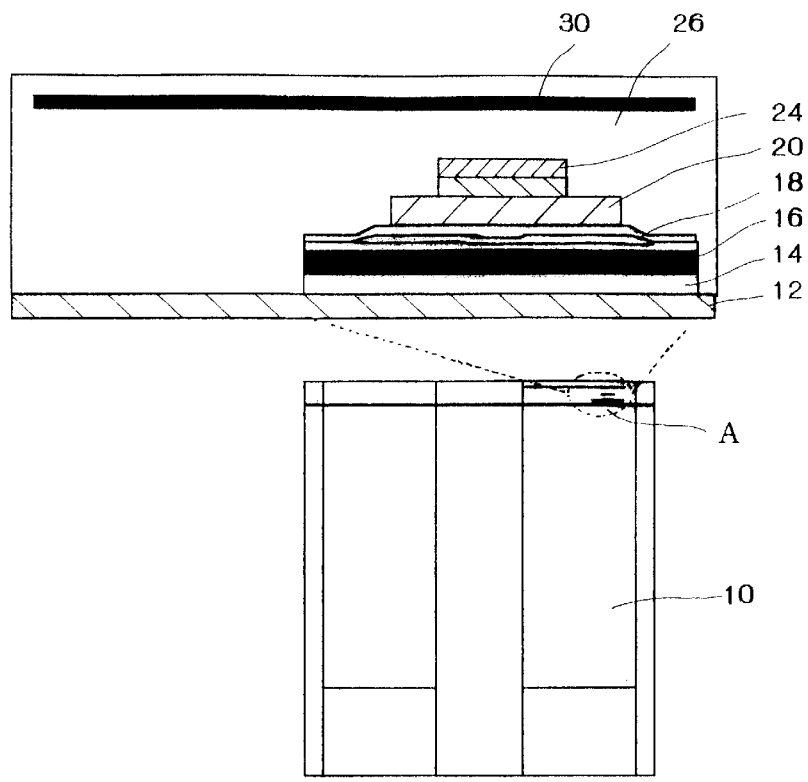
FIG. 1 is a sectional view of a magnetic head of a first embodiment of the present invention.
Figure 2:
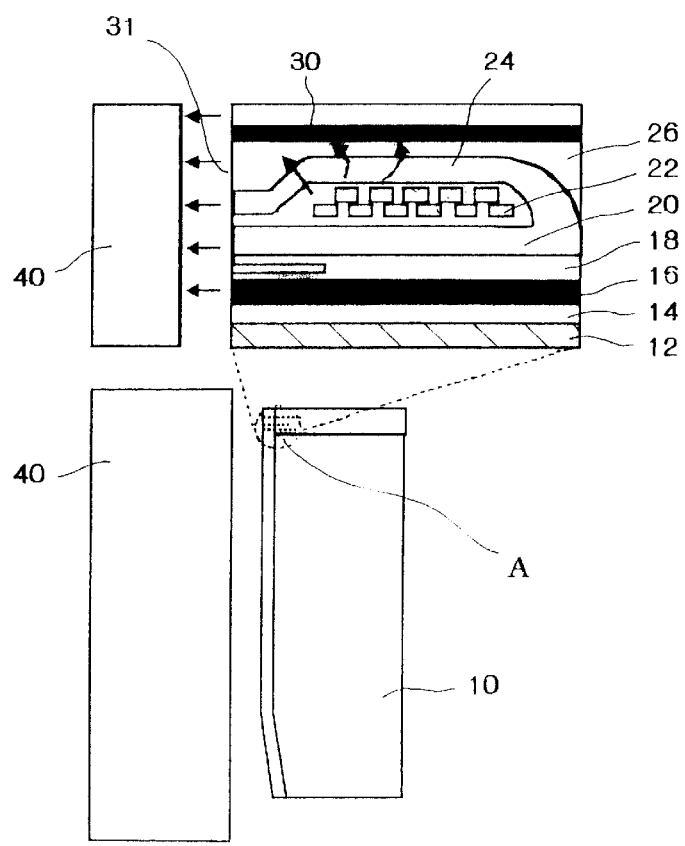
FIG. 2 is a side sectional view of the magnetic head of the first embodiment.

A first embodiment will be explained with reference to FIGS. 1 and 2. FIG. 1 is a sectional view of a magnetic head of the first embodiment seen from a disk-side face (a floating face) of a slider 10; FIG. 2 is a side sectional view thereof seen from a side face of the slider 10.

A section "A" of the slider 10 is a writing and reproducing section. Sectional views of the section "A" are shown in FIGS. 1 and 2. A structure of the section "A" is equal to the section "A" of the conventional magnetic head (see FIGS. 18A–19B). Namely, as shown in FIGS. 1 and 2, an alumina insulating layer 14, a lower shielding layer 16, an MR element layer 18, a lower magnetic pole 20, a coil 22 and an upper magnetic pole 24 are piled on an ALTIC substrate 12, which is a basic material of the slider 10, in this order.

Note that, arrangement of elements for writing and reproducing data with respect to a recording medium 40, e.g., a hard disk, is shown in FIG. 2. The elements are located close to a front end face of the slider 10. The MR element layer 18, the lower magnetic pole 20 and the upper magnetic pole 24 face a surface of the medium 40.

In the magnetic head of the present invention, a heat radiating layer is provided near the MR element or the coil, which generates heat, without touching the MR element, the coil, etc.. And, the heat radiating layer is made of a material whose heat conductivity is higher than that of the insulating layer, e.g., an alumina layer. The heat radiating layer can be formed in a film-forming step of forming the elements for writing and reproducing data. Namely, the heat radiating layer of the present invention can be formed by the conventional method including the steps of: coating photo resist; exposing; developing; and plating, spattering or evaporating. Preferably, the heat radiating layer is made of a non-magnetizable material, whose heat conductivity is higher than that of the insulating layer and which includes at least one of Pt, Au, Ag, Cu, Co, Ni, Fe, Al, etc.. Of course, two or more may be included in the non-magnetizable material. The non-magnetizable material is used so as not to influence the electric-magnetic converting property of the magnetic head.

In FIGS. 1 and 2, the heat radiating layer 30 is formed on a protective layer 26, which covers the upper magnetic pole 24. As shown in FIG. 1, the heat radiating layer 30 is parallel to an edge of the slider 10 and extended beyond the writing and reproducing section "A". With this structure, the heat radiating layer 30 can have enough area for effectively radiating heat. Since the heat radiating layer 30 is formed above the protective layer 26, the heat radiating layer 30 is separated from the upper magnetic pole 24, so that the heat radiating layer 30 can be extended over the section "A". As shown in FIG. 2, the heat radiating layer 30 is extended to the disk-side face 31 of the slider 10, and an end of the heat radiating layer 30 is exposed in the disk-side face 31. When the heat radiating layer 30 is formed, the end of the heat radiating layer 30 is located near the disk-side face 31. Then the disk-side face 31 is abraded to expose the end of the heat radiating layer 30.

In the first embodiment, heat generated in the coil 22 is conducted to the heat radiating layer 30 via the upper magnetic pole 24, then the heat is radiated from the heat radiating layer 30 toward the surface of the medium 40. Since the end of the heat radiating layer 30 is exposed in the disk-side face 31, the heat radiating layer 30 can be cooled and heat radiativity can be improved.

Second Embodiment

Figure 3:
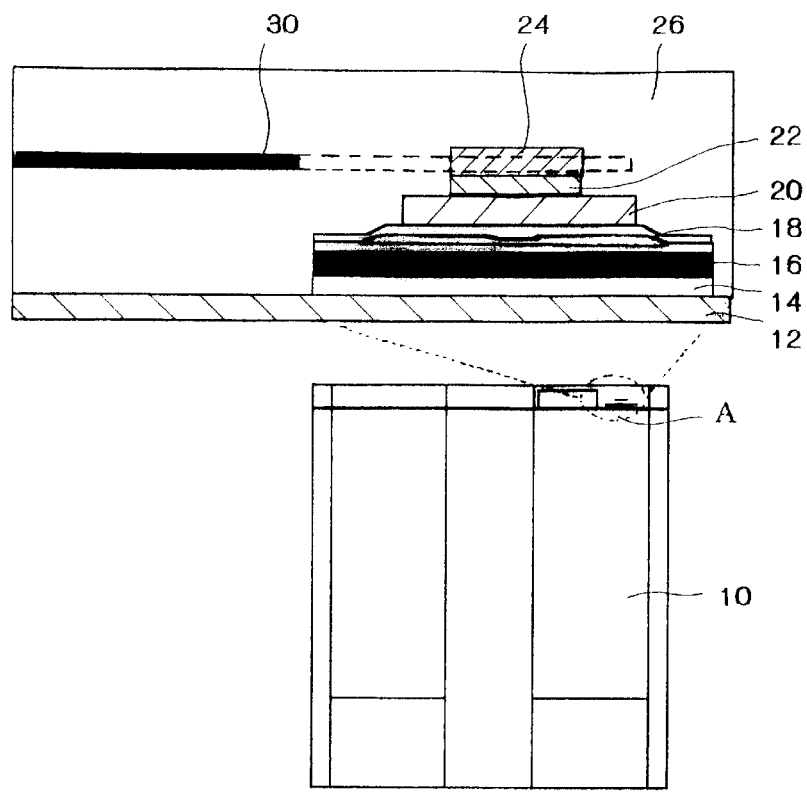
FIG. 3 is a sectional view of a magnetic head of a second embodiment of the present invention.
Figure 4:
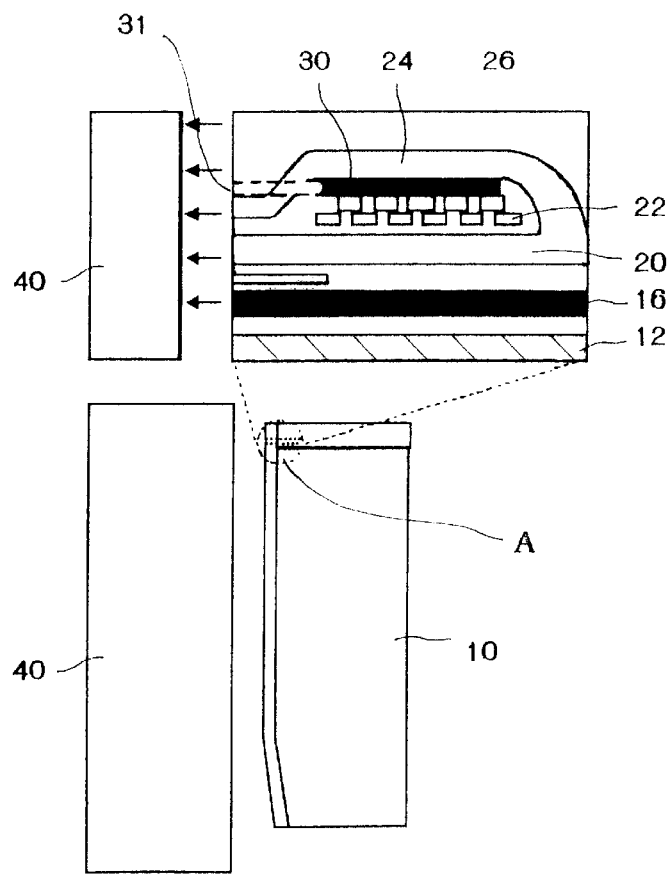
FIG. 4 is a side sectional view of the magnetic head of the second embodiment.
Figure 20:
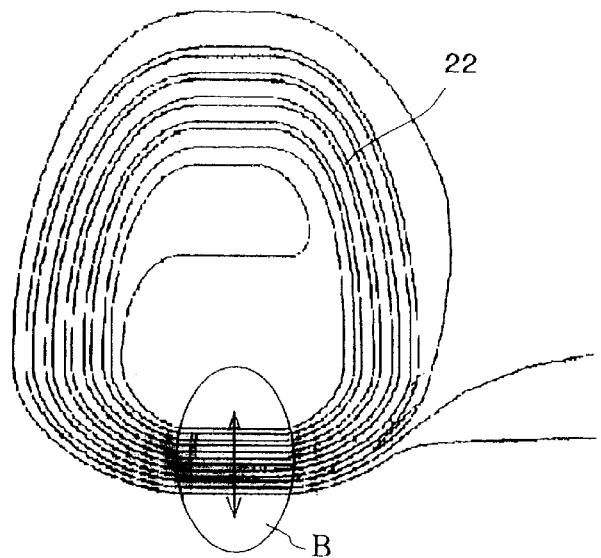
FIG. 20 is the plan view of the coil of the conventional magnetic head.

A second embodiment will be explained with reference to FIGS. 3 and 4. Members explained in the first embodiment are assigned the same symbols, and explanation will be omitted. In the second embodiment, the heat radiating layer 30 is provided between an upper part of the coil 22 and the upper magnetic pole 24 and separated therefrom. The MR element layer 18, the lower magnet pole 20, etc. are provided as well as the first embodiment shown in FIGS. 1 and 2. Note that, in other embodiments too, the MR element layer 18, the lower magnet pole 20, etc. are also provided as well as the first embodiment.

The heat radiating layer 30 is parallel to the edge of the slider 10 and extended beyond the writing and reproducing section "A". The end of the heat radiating layer 30 is exposed in the disk-side face 31 as well as the first embodiment. The heat radiating layer 30 and the upper magnet pole 24 are partially overlapped, but they are mutually separated. In the present embodiment, the heat radiating layer 30 is very close to the coil 22, so that heat generated in the coil 22 can be efficiently conducted to the heat radiating layer 30 and radiated from the heat radiating layer 30 toward the surface of the medium 40.

Third Embodiment

A third embodiment will be explained with reference to FIGS. 5 and 6. Members explained in the foregoing embodiments are assigned the same symbols, and explanation will be omitted. In the third embodiment, the heat radiating layer 30 and the coil 22 are formed in the same layer (level).

The heat radiating layer 30 is parallel to the edge of the slider 10 and extended beyond the writing and reproducing section "A". The end of the heat radiating layer 30 is exposed in the disk-side face 31 as well as the second embodiment. The heat radiating layer 30 and the upper magnet pole 24 are partially overlapped, but the heat radiating layer 30 is designed so as not to interfere with the coil 22 in the same layer. Planar arrangement of the coil 22 and the heat radiating layer 30 is shown in FIG. 7.

Figure 7:
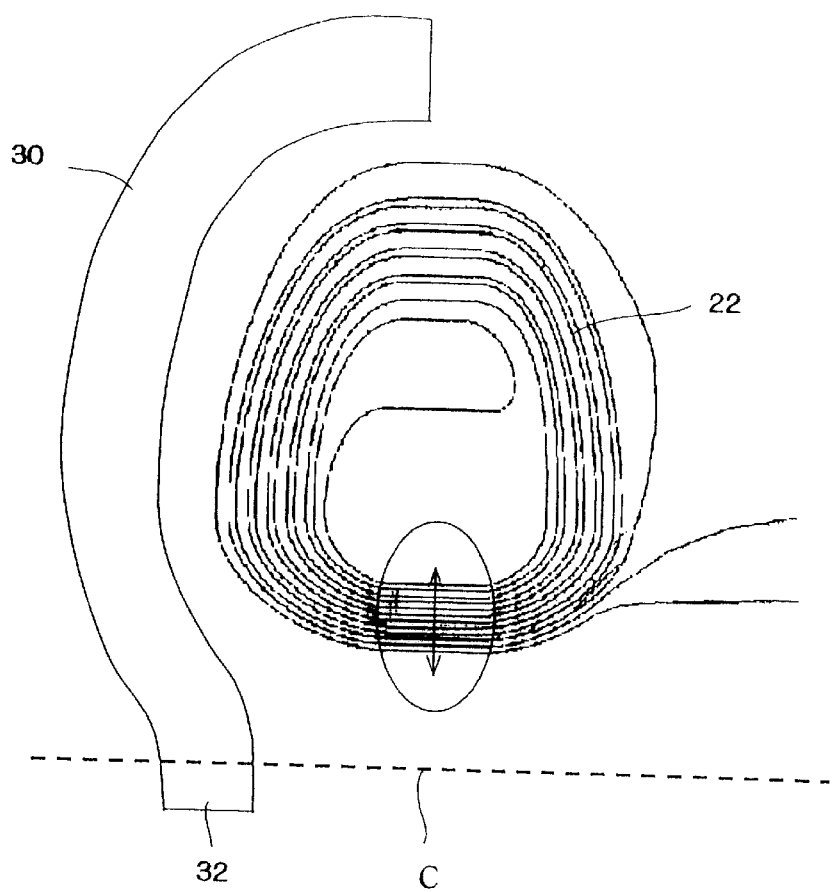
FIG. 7 is a plan view showing a heat radiating layer and planar arrangement of a coil.

In FIG. 7, the heat radiating layer 30 is provided on the outer side of the coil 22 and extended along an outer edge of the coil 22. When the heat radiating layer 30 is formed, the end 32 of the heat radiating layer 30 is projected from an abrading line "C". With this structure, the end 32 of the heat radiating layer 30 can be exposed by abrading the disk-side face 31 of the slider 10 until reaching the abrading line "C".

In the case of forming the heat radiating layer 30 and the coil 22 in the same layer, the heat radiating layer 30 can be simultaneously formed in a step of patterning the coil 22. Namely, the coil 22 and the heat radiating layer 30 can be formed in the same step, so no extra step is required. Unlike the case of forming the heat radiating layer 30 and the coil 22 in separate steps, mutual shift of positions of the heat radiating layer 30 and the coil 22 can be small, so that a space between the coil 22 and the heat radiating layer 30 can be narrower. By the narrow space, the heat can be efficiently conducted from the coil 22 to the heat radiating layer 30, so that the heat radiativity can be improved.

Note that, the heat radiating layer 30 can be provided between an upper part of the coil 22b and a lower part of the coil 22 as shown in FIG. 6. In this case, the heat radiating layer 30 is formed after the lower part of the coil 22 is formed, then the upper part of the coil 22 is formed. By forming the heat radiating layer 30 between the lower part of the coil 22 and the upper part of the coil 22, the heat radiating layer 30, which is electrically insulated from the coil 22, can be very close to the coil 22, so that the heat generated in the coil 22 can be efficiently radiated. In the present embodiment too, the heat radiating layer 30 is separated from the coil 22, the upper magnetic pole 24, etc., and the end of the heat radiating layer 30 is exposed in the disk-side face 31 of the slider 10.

Fourth Embodiment

Figure 8:
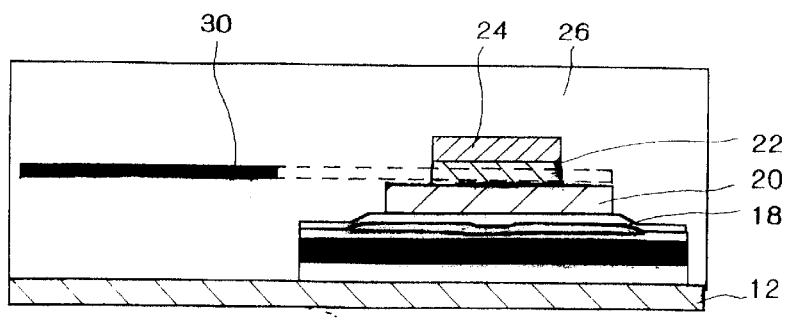
FIG. 8 is a sectional view of a magnetic head of a fourth embodiment of the present invention.
Figure 9:
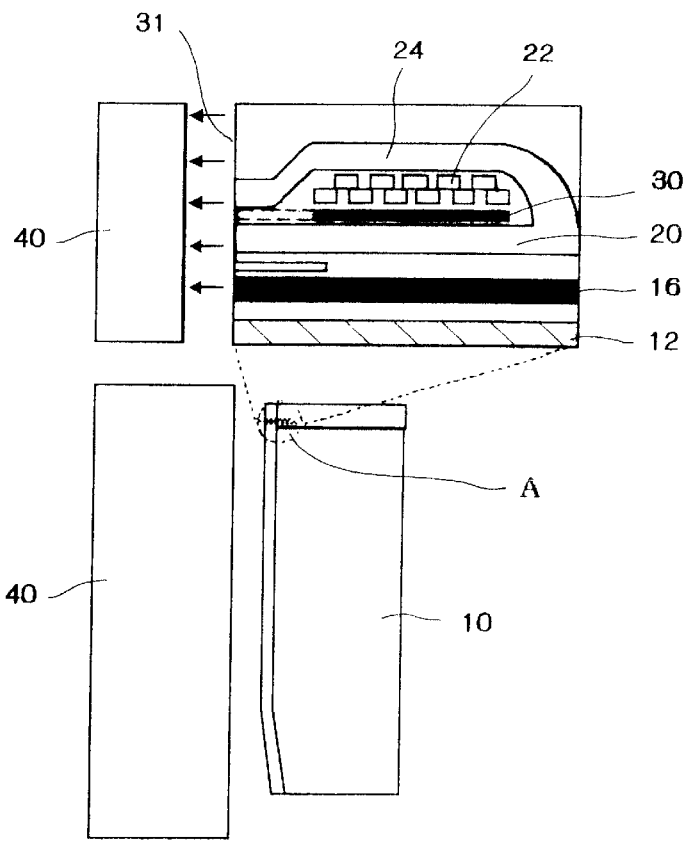
FIG. 9 is a side sectional view of the magnetic head of the fourth embodiment.

A fourth embodiment will be explained with reference to FIGS. 8 and 9. Members explained in the foregoing embodiments are assigned the same symbols, and explanation will be omitted. In the fourth embodiment, the heat radiating layer 30 is provided between the coil 22 and the lower magnet pole 20.

The heat radiating layer 30 is parallel to the edge of the slider 10 and extended beyond the writing and reproducing section "A". The end of the heat radiating layer 30 is exposed in the disk-side face 31 as well as the foregoing embodiments. In the present embodiment too, the heat radiating layer 30 is very close to the coil 22. With this structure, the heat generated in the coil 22 can be efficiently conducted to the heat radiating layer 30 and radiated therefrom. Namely, the heat radiativity can be improved. The disk-side face 31 facing the surface of the medium 40 is cooled by air stream, so the heat conducted from the coil 22 to the heat radiating layer 30 can be efficiently radiated from the end face of the heat radiating layer 30.

Fifth Embodiment

Figure 10:
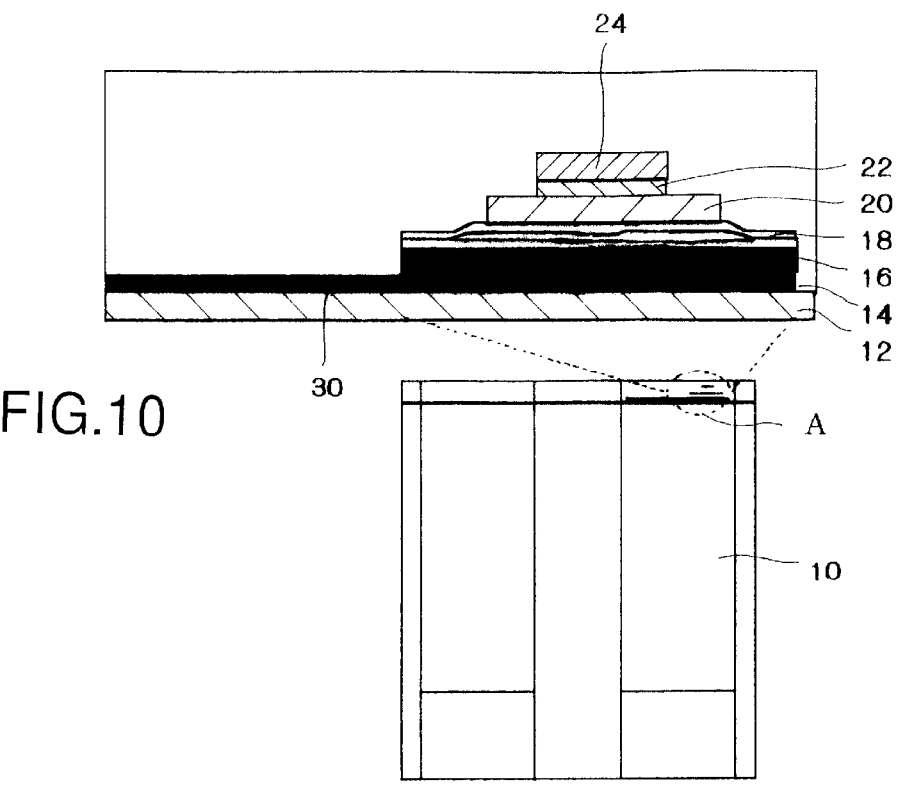
FIG. 10 is a sectional view of a magnetic head of a fifth embodiment.
Figure 11:
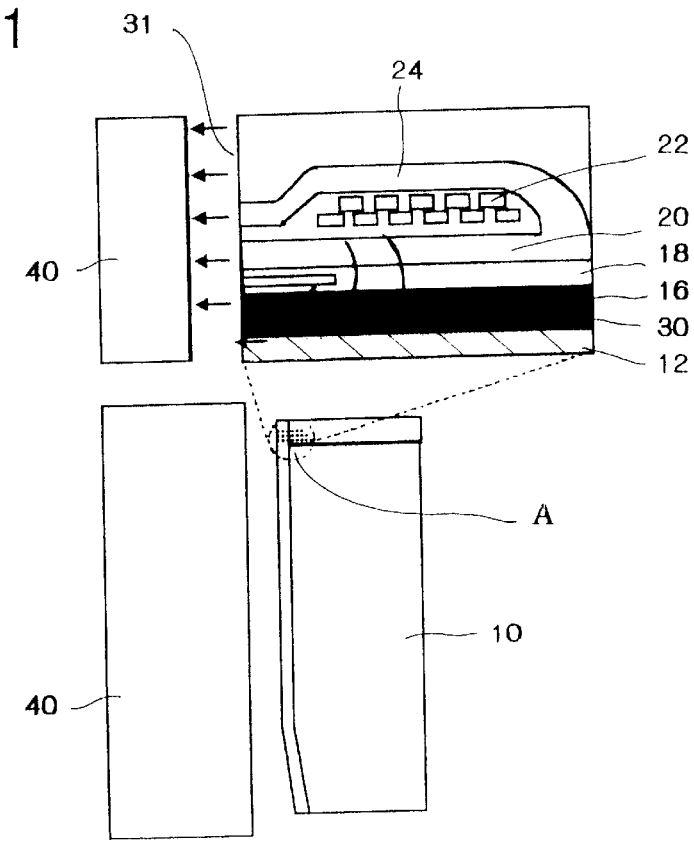
FIG. 11 is a side sectional view of the magnetic head of the fifth embodiment.

A fifth embodiment will be explained with reference to FIGS. 10 and 11. Members explained in the foregoing embodiments are assigned the same symbols, and explanation will be omitted. In the fifth embodiment, the heat radiating layer 30 is formed in the alumina insulating layer 14, which is formed between the lower shielding layer 16 and the ALTIC substrate 12. The heat radiating layer 30 is insulated from the lower shielding layer 16 and the ALTIC substrate 12 by the alumina insulating layer 14, so the heat insulating layer 30 and the alumina insulating layer 14 can be formed as the same layer without interfering with the lower magnet pole 20 and the coil 22. To further improve the heat radiativity, the end face of the heat radiating layer 30 is made broader. The end face of the heat radiating layer 30 is exposed in the disk-side face 31 of the slider 10.

In the present embodiment, the heat generated in the coil 22 and the MR element layer 18 are conducted downward via the lower shielding layer 16, then radiated from the heat radiating layer 30.

Sixth Embodiment

Figure 12:
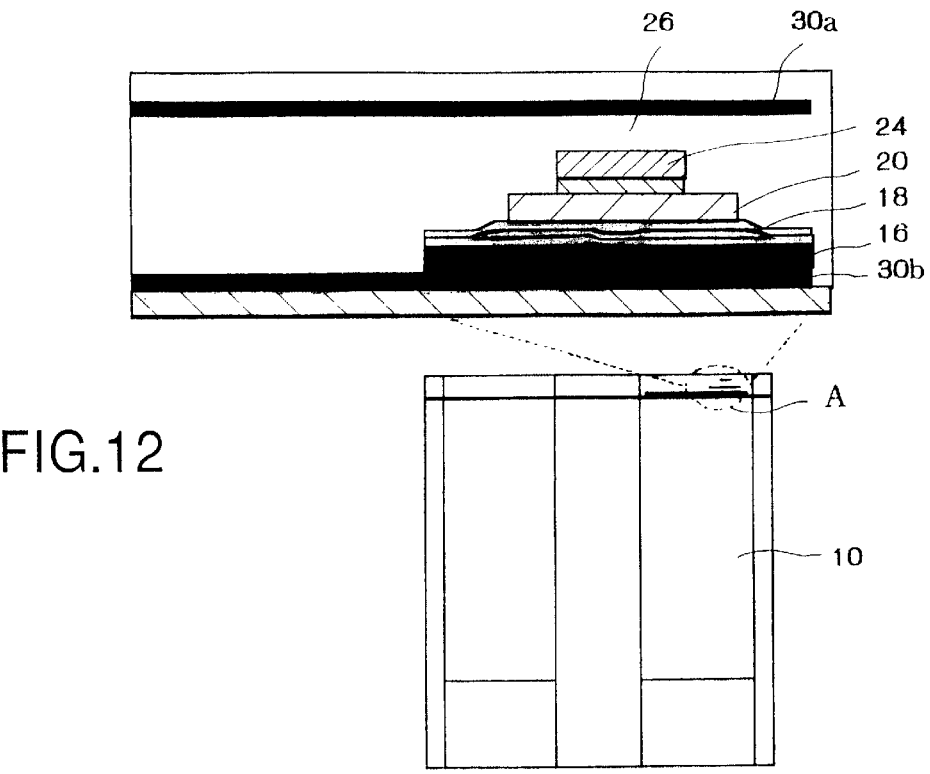
FIG. 12 is a sectional view of a magnetic head of a sixth embodiment.
Figure 13:
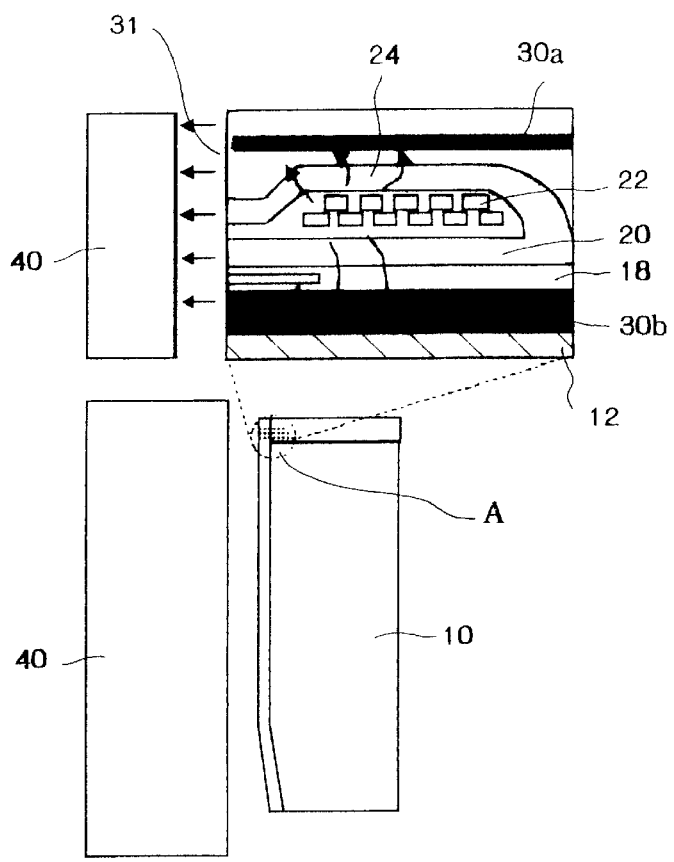
FIG. 13 is a side sectional view of the magnetic head of the sixth embodiment.

A sixth embodiment will be explained with reference to FIGS. 12 and 13. Members explained in the foregoing embodiments are assigned the same symbols, and explanation will be omitted. In the sixth embodiment, a plurality of the heat radiating layers are formed in the section "A". A first heat radiating layer 30a is formed in the alumina protective layer 26, which covers the upper magnet pole 24, a second heat radiating layer 30b is formed in the alumina insulating layer 14, which is formed between the lower shielding layer 16 and the ALTIC substrate 12. The first heat radiating layer 30a is equal to the heat radiating layer 30 of the first embodiment; the second heat radiating layer 30a is equal to the heat radiating layer 30 of the fifth embodiment.

In the present embodiment, the heat generated in the MR element layer 18 and the coil 22 can be efficiently radiated from the first heat radiating layer 30a and the second heat radiating layer 30b.

In each embodiment, the feature is the heat radiating layer 30 formed in the section "A". A method of forming the heat radiating layer 30 will be explained, as an example, with reference to FIGS. 14A–16C. In this example, the heat radiating layer 30 is formed between the coil 22 and the upper magnet pole 24.

Figure 14A:
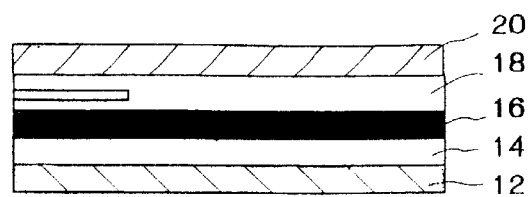
FIGS. 14A–14G show steps of manufacturing the magnetic head.
Figure 14B:
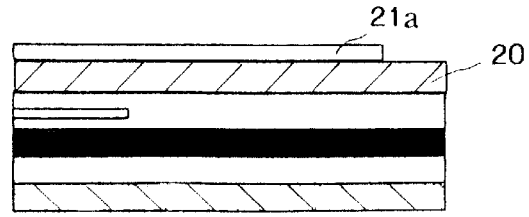

In FIG. 14A, the lower magnet pole 20 is formed after the alumina insulating layer 14, the lower shielding layer 16 and the MR element layer 18 are formed on the ALTIC substrate 12. The lower shielding layer 16, the MR element layer 18, etc. are formed by a known conventional method, so explanation will be omitted.

The lower magnetic pole 20 is formed by the steps of: coating photo resist on a surface of the MR element layer 18; exposing and developing the photo resist so as to expose a part, on which the lower magnetic pole 20 will be formed, on the surface of the MR element layer 18; plating the part to form the lower magnetic pole 20; and removing the photo resist by etching. The lower magnetic pole 20 is formed by, for example, NiFe plating.

FIG. 14A shows a step of forming an insulating layer 21a, which electrically insulates the lower magnetic pole 20 from the coil 22, on a surface of the lower magnetic pole 20. The insulating layer 21a is formed by the steps of: coating photo resist on the surface of the lower magnetic pole 20; exposing and developing the photo resist so as to expose a part on which the insulating layer 21a is formed; spattering alumina so as to form the insulating layer 21a; and removing the photo resist by lift-off.

Figure 14C:
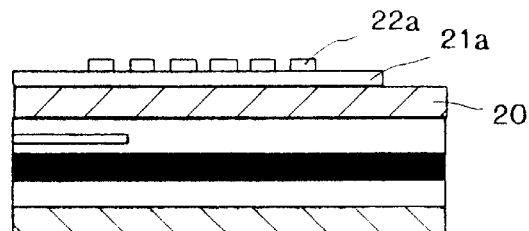

FIG. 14C shows a step of forming a lower coil 22a on a surface of the insulating layer 21a. The surface of the insulating layer 21a is thinly plated with copper, by electroless copper plating, so as to form an electric terminal for electrolytic plating. Then, the copper layer is coated with photo resist. The photo resist is exposed and developed to expose a pattern of the lower coil 22a, then the pattern is plated with copper so as to form the coil wire of the lower coil 22a. Next, the photo resist is removed by etching, and the thin copper terminal is removed by ion milling, so that the lower coil 22a having the prescribed pattern is formed on the surface of the insulating layer 21a.

Figure 14D:
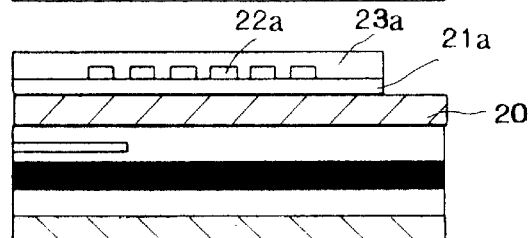

FIG. 14D shows a step of an insulating layer 23a between the lower coil 22a and the upper coil 22b. The coil 22a and the insulating layer 21a are coated with photo resist. Then, the photo resist is exposed and developed to pattern the photo resist. Further, the patterned photo resist is hard-baked to form the insulating layer 23a.

Figure 14E:
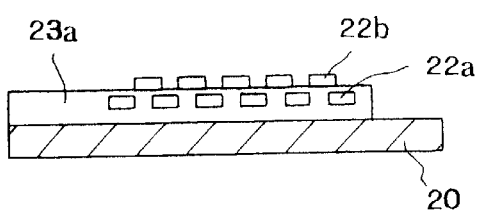

FIG. 14E shows a step of forming the upper coil 22b on the insulating layer 23a. Note that, the MR element layer 18 and other lower layers are omitted in FIG. 14E. The upper coil 22b is formed as well as the lower coil 22a. Namely, the surface of the insulating layer 23a is thinly plated with copper so as to form an electric terminal for electrolytic plating. Then, the copper layer is coated with photo resist. The photo resist is exposed and developed to expose a pattern of the lower coil 22b, then the pattern is plated with copper so as to form the coil wire of the lower coil 22b. Next, the photo resist and the thin copper terminal layer is removed, so that the upper coil 22b having the prescribed pattern is formed.

Figure 14F:
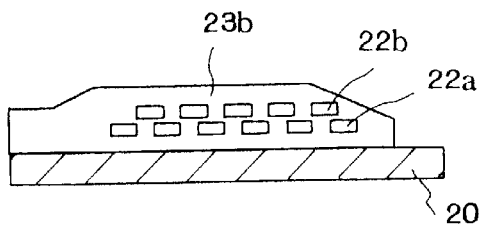

FIG. 14F shows a step of forming an insulating layer 23b over the upper coil 22b. The insulating layer 23b is formed as well as the insulating layer 23a. Namely, the coil 22b and the insulating layer 23a are coated with photo resist. Then, the photo resist is exposed and developed to pattern the photo resist. Further, the patterned photo resist is hard-baked to form the insulating layer 23b.

Figure 14G:
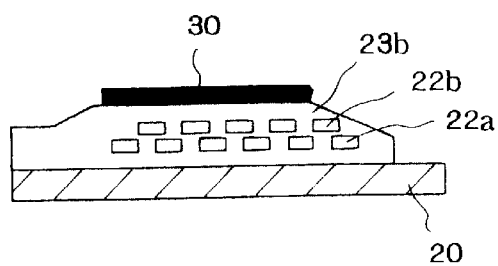
Figure 15:
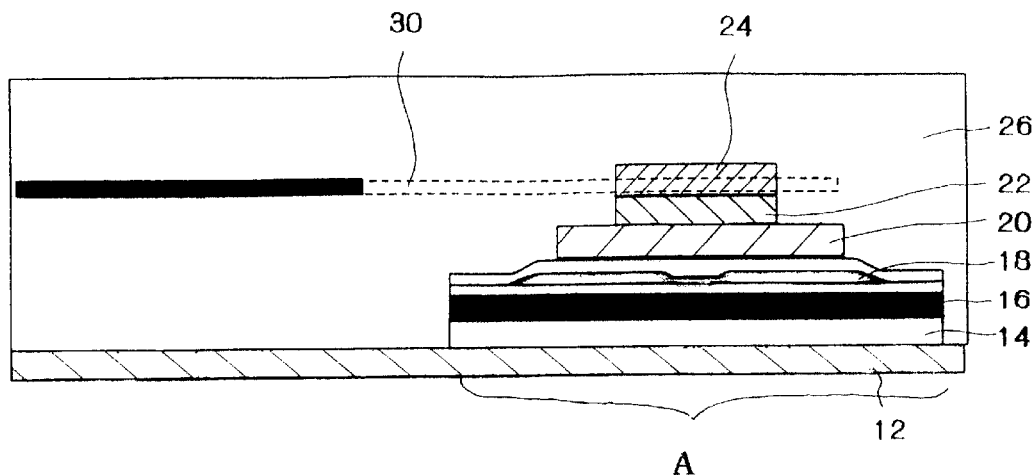
FIG. 15 is a sectional view of the heat radiating layer.

FIG. 14G is a step of forming the heat radiating layer 30 on a surface of the insulating layer 23b. In the present example, the heat radiating layer 30 is formed by copper plating. The surface of the insulating layer 23b is coated with photo resist. Then, the photo resist is exposed and developed to expose a part of the insulating layer 23b, on which the heat radiating layer 30 will be formed. Further, the exposed part is plated with copper so as to form the heat radiating layer 30. FIG. 15 is a sectional view of the magnetic head having the heat radiating layer 30. The heat radiating layer 30 is patterned so as not touch the upper magnetic pole 24, the coil 22, etc. To make heat radiating area broader, the heat radiating layer 30 is extended parallel to the edge of the slider 10 and beyond the recording and reproducing section "A". As well as the embodiment shown in FIG. 7, the end of the heat radiating layer 30 is projected from the abrading line, when the heat radiating layer 30 is formed. So, the end of the heat radiating layer 30 can be exposed in the disk-side face of the slider 10 by abrading the disk-side face until reaching the abrading line.

The heat radiating layer 30 is provided so as to efficiently radiate the heat generated in the MR element 18 and the coil 22, so the heat radiating layer 30 is made of a material having high heat conductivity, e.g., copper. Preferably, the heat conductivity of the heat radiating layer 30 is higher than that of alumina, which constitutes the insulating layers 14 and 21a. In the case of forming the coil 22 and the heat radiating layer 30 in the same layer, the heat radiating layer 30 can be simultaneously formed when the coil 22 is formed by copper plating. Namely, the heat radiating layer 30 and the coil 22 can be efficiently formed in one step.

Figure 16A:
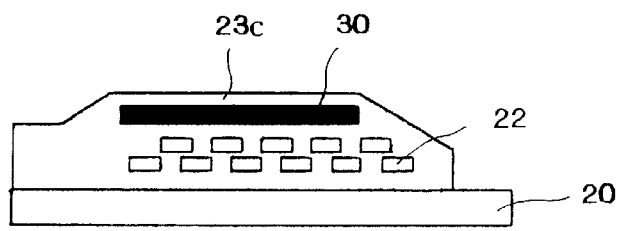
FIGS. 16A, 16B, and 16C show steps of manufacturing the magnetic head.

FIG. 16A shows a step of forming an insulating layer 23c on the heat radiating layer 30. The heat radiating layer 30 and the insulating layer 23b are coated with photo resist. Then, the photo resist is exposed and developed to pattern the photo resist. Further, the patterned photo resist is hard-baked to form the insulating layer 23c.

Figure 16B:
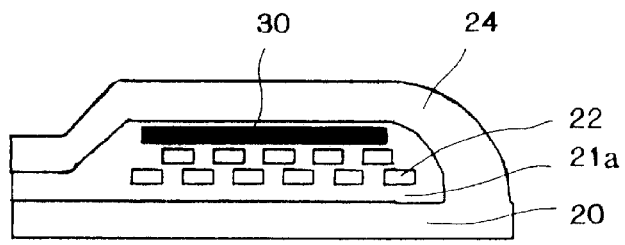

FIG. 16B shows a step of forming the upper magnetic pole 24. The upper magnetic pole 24 is formed by the steps of: coating photo resist on a surface of the insulating layer 23c; exposing and developing the photo resist so as to expose a part, on which the upper magnetic pole 24 will be formed; plating the part to form a magnetic resistance part, which will be the upper magnetic pole 24, with NiFe; and removing the photo resist.

Figure 16C:
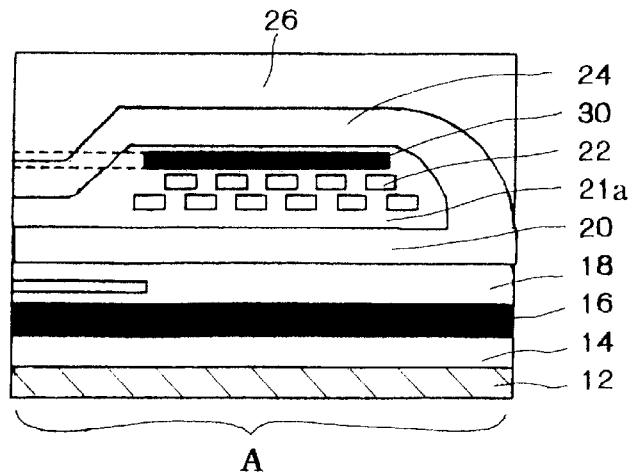

FIG. 16C shows a state in which the protective layer 26 is formed over the section "A" by spattering alumina. The magnetic head having the heat radiating layer 30, which corresponds to the section "A", can be manufactured by above described steps.

In each embodiment, the heat radiating layer 30 is capable of efficiently radiating the heat generated in the section "A", so that the heat radiativity can be improved. The elements for writing and reproducing data are formed, as films or layers, in order, so the heat radiating layer 30 can be simultaneously formed with another layer in one step.

In each embodiment, the end face of the heat radiating layer 30 is exposed in the disk-side face 31 of the slider 10. A heat radiating face, which has enough area and which is connected to the heat radiating layer 30, may be provided in the disk-side face 31 of the slider 10. The heat radiating face may be formed in the disk-side face 31 of the slider by a proper manner, e.g., spattering, plating. The heat radiating face is made of a material having high heat conductivity, e.g., copper. In another case, the heat radiating face may be formed by the steps of: forming the disk-side face by abrading the slider; patterning the heat radiating face in the disk-side face; and spattering or plating the patterned face.

Figure 17:
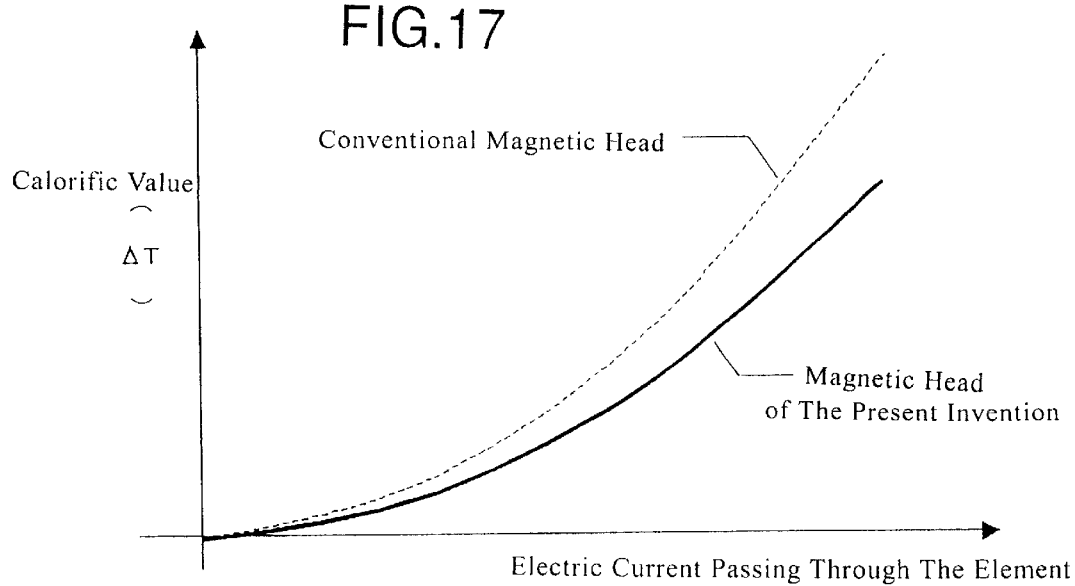
FIG. 17 shows a graph of calorific value of the magnetic head.
Figure 18A:
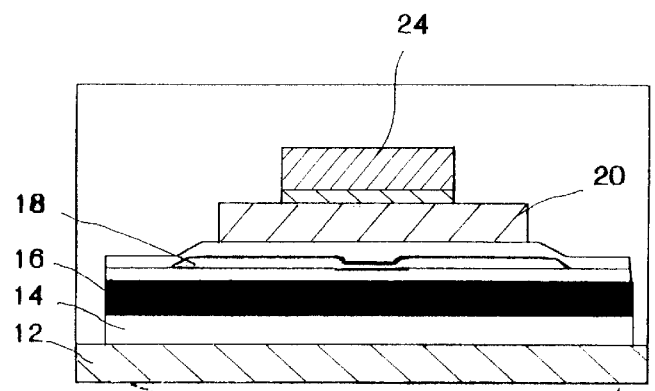
FIG. 18A is the sectional view of the conventional magnetic head.
Figure 18B:
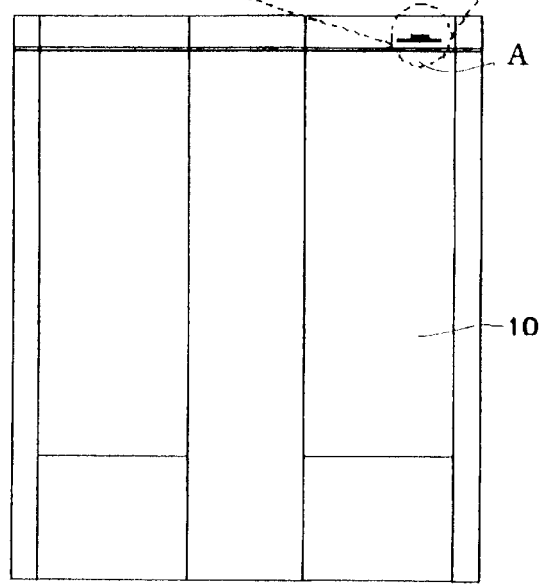
FIG. 18B is the plan view of the slider.

FIG. 17 is a graph of calorific value of the magnetic head of the present invention and the conventional magnetic head having no heat radiating layer. Calorific value is increased with increasing intensity of electric current passing through the elements. According to the graph, the magnetic head of the present invention can efficiently radiate the heat generated in the elements. Unlike the conventional magnetic head, the present invention is capable of preventing overheat of the magnetic head.

In an example in which the coil was one layer and had one turn, about 10% of rising temperature could be restricted and the highest temperature could be fallen about 5%.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A magnetic head, comprising:
    a slider having a disk-side face;
    an element for reproducing data;
    a shielding layer;
    a coil for writing data;
    magnetic poles;
    a heat radiating layer for radiating heat generated in said magnetic head; and
    an insulating layer for electrically insulating said heat radiating layer,
    wherein said heat radiating layer is provided between an upper magnetic pole and said coil together with said insulating layer near said element or said coil without touching said element, said shielding layer, said coil and said magnetic poles, said heat radiating layer is made of a material whose heat conductivity is higher than that of said insulating layer, and an end of said heat radiating layer is exposed in the disk-side face of said slider.

2. A magnetic head, comprising:

a slider having a disk-side face;

an element for reproducing data;

a shielding layer;

a coil for writing data;

magnetic poles;

a heat radiating layer for radiating heat generated in said magnetic head; and an insulating layer for electrically insulating said heat radiating layer, wherein said heat radiating layer and said coil are formed in the same layer, said heat radiating layer is provided near said element or said coil without touching said element, said shielding layer, said coil and said magnetic poles, said heat radiating layer is made of a material whose heat conductivity is higher than that of said insulating layer, and an end of said heat radiating layer is exposed in the disk-side face of said slider.

3. A magnetic head, comprising:

a slider having a disk-side face;

an element for reproducing data;

a shielding layer;

a coil for writing data;

magnetic poles;

a heat radiating layer for radiating heat generated in said magnetic head; and an insulating layer for electrically insulating said heat radiating layer, wherein said heat radiating layer is provided between a lower magnetic pole and said coil together with said insulating layer, near said element or said coil without touching said element, said shielding layer, said coil and said magnetic poles, said heat radiating layer is made of a material whose heat conductivity is higher than that of said insulating layer, and an end of said heat radiating layer is exposed in the disk-side face of said slider.

4. A magnetic head, comprising:

a slider having a disk-side face;

an element for reproducing data;

a shielding layer;

a plurality of coils for writing data respectively formed into a plurality of coil layers, a coil for writing data;

magnetic poles;

a heat radiating layer for radiating heat generated in said magnetic head, said heat radiating layer being provided between said coil layers, and an insulating layer for electrically insulating said heat radiating layer, wherein said heat radiating layer is provided near said element or said coils without touching said element, said shielding layer, said coils and said magnetic poles, said heat radiating layer is made of a material whose heat conductivity is higher than that of said insulating layer, and an end of said heat radiating layer is exposed in the disk-side face of said slider.

5. A magnetic head comprising a plurality of heat radiating layers selected from said heat radiating layers of claims 1–4.

6. The magnetic head according to any one of claims 1–4, wherein said heat radiating layer is made of a non-magnetizable material including at least Pt, Au, Ag, Cu, Co, Ni, Fe or Al.

7. The magnetic head according to any one of claims 1–4, wherein a heat radiating face is formed in the disk-side face of said slider, and said heat radiating face is connected to the end of said heat radiating layer.

* * * * *

UNITED STATES PATENT AND TRADEMARK OFFICE
CERTIFICATE OF CORRECTION

PATENT NO. : 6,731,461 B2
DATED : May 4, 2004
INVENTOR(S) : Yamada et al.

Page 1 of 1

It is certified that error appears in the above-identified patent and that said Letters Patent is hereby corrected as shown below:

Column 8,
Line 67, after "insulating layer" insert -- , -- therefor.

Signed and Sealed this

Twenty-first Day of December, 2004

JON W. DUDAS
*Director of the United States Patent and Trademark Office*